Nov. 20, 1934.   W. E. GEE   1,981,619

PUMP

Filed July 29, 1932

INVENTOR
WILLIAM E. GEE
By R. H. Weatherford

Patented Nov. 20, 1934

1,981,619

UNITED STATES PATENT OFFICE 1,981,619

PUMP

William E. Gee, Memphis, Tenn.

Application July 29, 1932, Serial No. 626,136

6 Claims. (Cl. 103—126)

This invention relates to improvements in pumps of the rotary or gear type such as are commonly used for pumping liquids and has especial reference to means for compensating for wear on the ends of the gears and for maintaining the water seal in such a device.

In pumps of the gear type it is essential that the ends of the gears fit closely against the housing as well as fitting closely in other places. Owing to tendency to gear shafts to oscillate and owing also to wearing action due to grit or other causes there is a rapid end wear in such pumps which increases the clearance and effectually destroys the usefulness of the pump while there is little wear otherwise.

The objects of the present invention are:

(a) To provide means for taking up the end wear automatically; and (b) To provide means for maintaining the necessary seal at the gear ends and in the movable parts of the take up structure.

The means by which the foregoing and other objects are accomplished and the manner of their accomplishment will readily be understood from the following specification on reference to the accompanying drawing, in which:—

Figure 4:
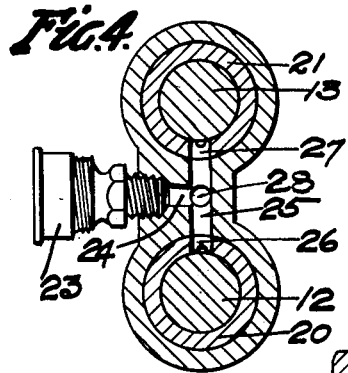
Fig. 4 is a section on the line IV—IV of Fig. 1.
Figure 1:
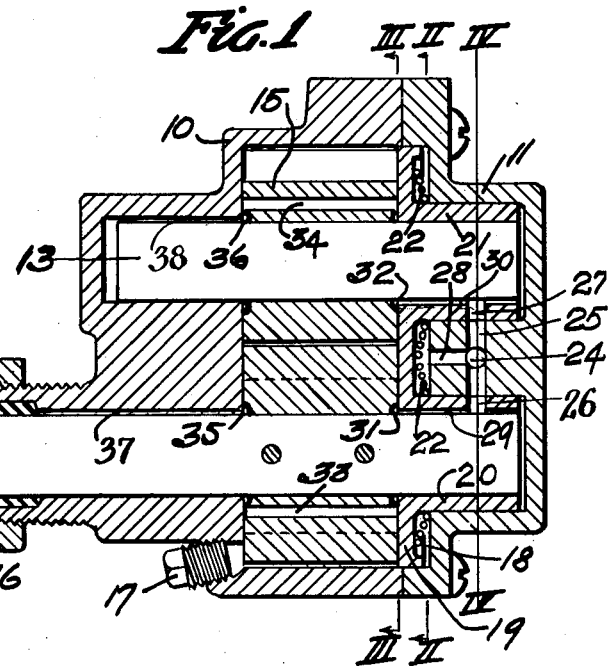
Fig. 1 is a sectional elevation taken along the center line of the pump shafts.
Figure 2:
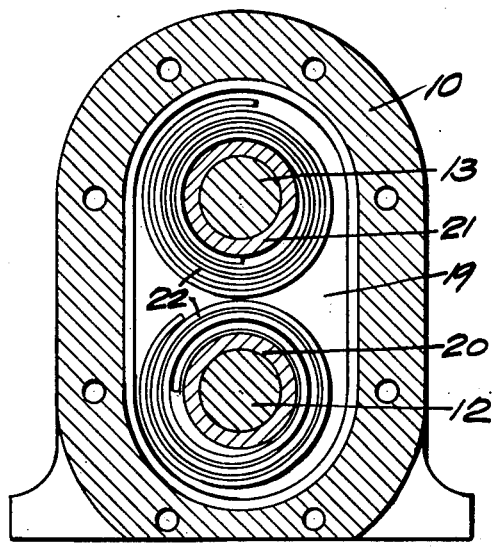
Fig. 2 is a sectional elevation on the line II—II of Fig. 1.
Figure 3:
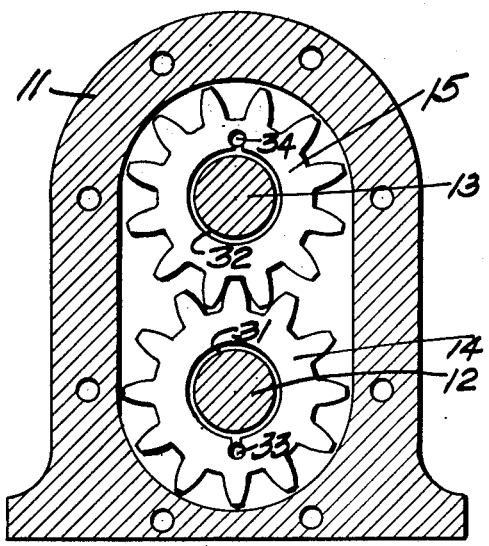
Fig. 3 is a sectional elevation on the line III—III of Fig. 1.

Referring now to the drawing in which the various parts are indicated by numerals, the pump comprises a casing 10 which is of usual type, chambered out to receive and conform to the pump gears, a head 11 embodying the present improvements, shafts 12 and 13 journalled in the casing and head, and meshing gears 14, 15 which are secured on these shafts. 16 is the usual stuffing box and 17 a drain plug.

The head 11 is preferably provided with a shallow chamber 18 conforming in shape to the gear chamber in the casing 10. Disposed in the chamber 18 and preferably projecting initially slightly into the gear chamber in the casing is a false head or follow plate which conforms closely to the chamber contours but is slidable therein. The follow plate 19 is bored out for the shafts 12 and 13 and is preferably provided with integral hubs 20—21 similarly bored out for the shafts. These hubs fit in suitable recesses in the head 11 and form the bearing therein for the two shafts. Disposed in the recess 18 between the follow plate 19 and the cover plate 11 are coil springs 22 which hold the follow plate against the ends of the gears. 23 is a grease cup which is in communication through a passageway 24 and a cross passageway 25, and through aligned openings 26—27 in the hubs 20—21, with the shafts 12 and 13 respectively. From the passageway 24 a passageway 28 leads into the chamber 18 behind the follow plate. The bosses 20—21 are each provided with a grease channel, 29—30 respectively which channels communicate with annular grooves 31—32 in the ends of the gears. Each of the gears is also provided with a longitudinal passageway 33—34 respectively which establish communication between the respective grooves 31—32 and similar annular grooves 35—36 at the opposite ends of the gears. grooves 37—38 extend longitudinally from the annular grooves 35—36 respectively.

In setting up the pump for use, grease is forced from the grease cup 23 through the passageways until the chamber 18 and the annular grooves are filled with the grease, and from time to time in operation of the pump such additional grease as is necessary is forced in. During operation the follow head 19 is held seated against the gears by the action of the springs and as wear occurs the same is taken up by the spring actuated movement of this head. At all times the grease forced in not only lubricates the pump shafts and gear ends but acts as a seal to prevent end leakage thus maintaining the useful life of the pump over an extended period; also, such grease serves to prevent, or at least impede, retractive movement of the follow head 19, and thereby tends to prevent sudden, jarring movement, or clatter, of said head, and excessive wear upon the ends and/or the cylindrical surfaces of the parts thereof.

Having described my invention, what I claim is:

1. In a gear pump, a chambered housing comprising a casing having one end open, and a head closing said open end, a pair of complementary shafts journalled in said housing, complementary pump gears mounted on said shafts, said gears each having annular grooves at opposite ends thereof and a passageway establishing communication between said grooves, said housing chamber being of greater length than said gears, a follow plate peripherally fitting said chamber disposed therein abutting one end of said gears, said plate having passageways therethrough leading to said gear grooves, springs disposed in said chamber between said plate and head urging said plate against said gears, and a grease cup mounted on said head, said head having passageways therethrough establishing communication from said cup to said spring chamber and to said plate grooves, whereby said spring chamber and grooves may be maintained full of grease to seal the ends of said gears.

2. In a pump, a casing and a removable head, complementary gear shafts journalled in said casing and head, complementary gears mounted on said shafts, said gears each having annular grooves in both ends and a longitudinal passageway establishing communication between said grooves, said casing being hollowed out to form a suitable chamber for said gears and having an end wall with which one end of each of said gears abuts, a follow plate disposed within said casing and head and in contact with the opposite ends of said gears, said plate having passageways therethrough, leading along said shafts and to said annular grooves, resilient means disposed between said head and follow plate urging said follow plate into contact with the gear ends and means for introducing lubricant into said removable head, said head having passageways therethrough communicating with the space in said chamber behind said plate and with passageways through said plate, whereby a seal is maintained at said gear ends and in the chamber between said plate and head.

3. In a gear pump, a chambered housing comprising a casing having one end open, and a head closing said open end, a pair of complementary shafts journalled in said housing, complementary pump gears mounted on said shafts, said housing chamber being of greater length than said gears, a follow plate, peripherally fitting said chamber, disposed therein abutting one end of said gears, and separating said chamber into a gear chamber and a non-communicating grease chamber, said plate being slidable only toward said gears, resilient means disposed in said grease chamber urging said plate against said gears, and means for filling said grease chamber with grease, whereby sealing is accomplished and retraction of said plate is prevented.

4. In a gear pump, a chambered housing comprising a casing having one end open, and a head closing said open end, a pair of complementary shafts journalled in said housing, complementary pump gears mounted on said shafts, said housing chamber being of greater length than said gears, a follow plate peripherally fitting said chamber, and slidable only toward said gears, disposed in said chamber abutting one end of said gears, and separating said chamber into a gear chamber and a non-communicating grease chamber, springs disposed in said grease chamber between said plate and head urging said plate against said gears, and means for maintaining said grease chamber full of grease, whereby sealing is accomplished, and retraction of said plate is prevented.

5. In a gear pump, a chambered housing comprising a casing having one end open, and a head closing said open end, a pair of complementary shafts having opposite ends journalled in said casing and head, complementary pump gears mounted on said shafts, said housing chamber being of greater length than said gears, a follow plate peripherally fitting said chamber, and around said shafts, disposed in said chamber abutting one end of said gears, and separating said chamber into a gear chamber and a non-communicating grease chamber, said plate being slidable only toward said gears, springs disposed in said grease chamber between said plate and head urging said plate against said gears, and means for maintaining said grease chamber full of grease, whereby a self-adjusting sealed-end housing is accomplished, and retraction of said plate is prevented.

6. In a gear pump, a chambered housing comprising a casing having one end open, and a head closing said open end, a pair of complementary shafts journalled in said housing, complementary pump gears mounted on said shafts, said housing chamber being of greater length than said gears, a follow plate, peripherally fitting said chamber, and slidable only toward said gears, disposed in said chamber, abutting one end of said gears, said plate separating said chamber into a gear chamber and a non-communicating grease chamber, and being slidable only toward said gears, said plate having integral hubs bored out to receive and journal said shafts, said head being bored out to receive and center said hubs, springs disposed in said grease chamber between said head and follow plate urging said plate against the ends of said gears, and means for maintaining said grease chamber full of grease whereby sealing is accomplished and retractive movement of said plate is prevented.

WILLIAM E. GEE.